US012776545B2

(12) United States Patent
Shin et al.

(10) Patent No.: US 12,776,545 B2
(45) Date of Patent: Oct. 27, 2026

(54) BATTERY MODULE COMPRISING CORNER COVER COVERING CONNECTION TO BATTERY PROCESSOR

(71) Applicant: LG ENERGY SOLUTION, LTD., Seoul (KR)

(72) Inventors: Jong-Chan Shin, Daejeon (KR); Byung-Hyuk Choi, Daejeon (KR); Ki-Youn Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 550 days.

(21) Appl. No.: 18/279,552

(22) PCT Filed: Dec. 20, 2022

(86) PCT No.: PCT/KR2022/020893
§ 371 (c)(1),
(2) Date: Aug. 30, 2023

(87) PCT Pub. No.: WO2023/121261
PCT Pub. Date: Jun. 29, 2023

(65) Prior Publication Data
US 2024/0304929 A1 Sep. 12, 2024

(30) Foreign Application Priority Data
Dec. 20, 2021 (KR) ........................ 10-2021-0183245

(51) Int. Cl.
*H01M 50/262* (2021.01)
*H01M 10/42* (2006.01)
(Continued)

(52) U.S. Cl.
CPC ....... *H01M 50/262* (2021.01); *H01M 10/425* (2013.01); *H01M 50/298* (2021.01); *H01M 50/271* (2021.01)

(58) Field of Classification Search
CPC .......................... H01M 50/298; H01M 10/425
See application file for complete search history.

(56) References Cited

U.S. PATENT DOCUMENTS 9,136,513 B2 9/2015 Kim
9,564,663 B2 2/2017 Kim et al.
(Continued)

FOREIGN PATENT DOCUMENTS

CN 104835979 A 8/2015
CN 107925030 A 4/2018
(Continued)

OTHER PUBLICATIONS

Extended European Search Report for European Application No. 22911894.8, dated Feb. 24, 2025.
(Continued)

*Primary Examiner* — Barbara L Gilliam
*Assistant Examiner* — Jordan E Berresford
(74) *Attorney, Agent, or Firm* — Birch, Stewart, Kolasch & Birch, LLP

(57) ABSTRACT

A battery pack includes a battery module; a processor having a corner formed by two side plates and an opening at the corner, wherein the processor is electrically connected to the battery module and controls charge/discharge of the battery module; and a corner cover which is coupled to the corner and covers the opening.

16 Claims, 10 Drawing Sheets

(51) Int. Cl.
*H01M 50/271* (2021.01)
*H01M 50/298* (2021.01)

(56) References Cited

U.S. PATENT DOCUMENTS

| | | | |
|---|---|---|---|
| 9,786,960 B2 | 10/2017 | Miyawaki et al. | |
| 10,079,407 B2 | 9/2018 | Kim | |
| 10,615,385 B2 | 4/2020 | Takahashi et al. | |
| 10,818,882 B2 | 10/2020 | Zhang et al. | |
| 2012/0003505 A1* | 1/2012 | Kim .................... | H01M 10/425 429/7 |
| 2015/0228954 A1 | 8/2015 | Wang et al. | |
| 2016/0156072 A1 | 6/2016 | Wang et al. | |
| 2018/0212215 A1 | 7/2018 | Park et al. | |
| 2021/0313630 A1 | 10/2021 | Zeiler et al. | |
| 2022/0278389 A1 | 9/2022 | Chi et al. | |

FOREIGN PATENT DOCUMENTS

| | | | |
|---|---|---|---|
| CN | 209912942 | U | 1/2020 |
| CN | 113745733 | A | 12/2021 |
| EP | 2 704 168 | A1 | 3/2014 |
| EP | 2 911 216 | A1 | 8/2015 |
| EP | 4 329 079 | A1 | 2/2024 |
| JP | 2011-159482 | A | 8/2011 |
| JP | 5552109 | B2 | 7/2014 |
| JP | 2014-182945 | A | 9/2014 |
| JP | 2017-50121 | A | 3/2017 |
| JP | 6217428 | B2 | 10/2017 |
| JP | 6526961 | B2 | 6/2019 |
| JP | 6545212 | B2 | 7/2019 |
| JP | 2021-84601 | A | 6/2021 |
| KR | 10-0240680 | B1 | 1/2000 |
| KR | 10-2012-0002874 | A | 1/2012 |
| KR | 10-2013-0001970 | A | 1/2013 |
| KR | 10-2013-0003575 | A | 1/2013 |
| KR | 10-2013-0108691 | A | 10/2013 |
| KR | 10-2015-0019697 | A | 2/2015 |
| KR | 10-1608333 | B1 | 4/2016 |
| KR | 10-2017-0138200 | A | 12/2017 |
| KR | 10-1902445 | B1 | 9/2018 |
| KR | 10-2021-0017273 | A | 2/2021 |

OTHER PUBLICATIONS

International Search Report for PCT/KR2022/020893 (PCT/ISA/210) mailed on Mar. 23, 2023.

* cited by examiner

BATTERY MODULE COMPRISING CORNER COVER COVERING CONNECTION TO BATTERY PROCESSOR

TECHNICAL FIELD

The present application claims priority to Korean Patent Application No. 10-2021-0183245 filed on Dec. 20, 2021 in the Republic of Korea, the disclosure of which is incorporated herein by reference.

The present disclosure relates to a battery pack.

BACKGROUND ART

Currently, commercially available secondary batteries include nickel-cadmium batteries, nickel-hydrogen batteries, nickel-zinc batteries, lithium secondary batteries and the like. Among them, lithium secondary batteries have little or no memory effect, and are gaining more attention than nickel-based secondary batteries as recharging can be done whenever it is convenient. Further, lithium secondary batteries provide a low self-discharge rate with high energy density capability.

The lithium secondary batteries mainly use a lithium-based oxide and a carbon material as a positive electrode active material and a negative electrode active material, respectively. In addition, the lithium secondary batteries include an electrode assembly including a positive electrode plate and a negative electrode plate respectively coated with the positive electrode active material and the negative electrode active material and a separator interposed between the positive electrode plate and the negative electrode plate, and a hermetically sealed packaging or battery case in which the electrode assembly is received together with an electrolyte solution.

According to the shape of the battery case, lithium secondary batteries may be classified into can-type secondary batteries in which the electrode assembly is included in a metal can and pouch-type secondary batteries in which the electrode assembly is included in a pouch made of an aluminum laminate sheet.

The secondary batteries are widely used in not only small devices such as mobile electronic devices but also medium- and large-scale devices such as electric vehicles or Energy Storage Systems (ESSs), and the use is growing fast. Further, recently, home ESSs are widely used to store and supply power for use in houses or buildings. The essential component of the home ESSs is a battery pack.

Various types of battery packs including battery packs used in home ESSs include a plurality of battery cells (secondary batteries) to increase the capacity and/or output. In particular, there is a need for ESSs that are flexible to change the configuration of battery packs to satisfy various customer needs. Additionally, there is a need for ESSs that can adapt the shape to a variety of limited installation spaces.

DISCLOSURE

Technical Problem

The present disclosure is designed to solve these and other problems.

The present disclosure is directed to providing a battery pack that can change the number of battery modules.

The present disclosure is further directed to providing a battery pack that can change the number of processing units.

The present disclosure is further directed to providing a battery pack that can change the appearance.

The present disclosure is further directed to providing a battery pack including a corner cover to cover a corner between an adjacent battery module or an adjacent processing unit and a battery module.

The present disclosure is further directed to providing a battery pack with improved productivity and assembly through component sharing.

Technical Solution

To achieve the above-described objective, a battery pack according to an aspect of the present disclosure at least one battery module; a processor having a housing with a corner formed by two side plates and a first opening at the corner, wherein the processor is electrically connected to the at least one battery module and controls charge/discharge of the at least one battery module; and a first corner cover which is coupled to the corner and covers the first opening.

The battery pack may further include a cable which passes through the first opening, and electrically connects the at least one battery module to the processor.

The battery pack may further include a front cover which is disposed on a front surface of the processor and covers a front side of the first corner cover.

The first corner cover may include a protruding portion which protrudes from the front side of the first corner cover and is inserted into the front cover.

The at least one battery module may be disposed at rear of the processor, and the battery pack may further include a coupling member, wherein a first side of the coupling member is secured to the corner of the processor and a second side of the coupling member is secured to the corner of the at least one battery module.

The first corner cover may be slidably coupled to the coupling member in a front-rear direction.

The first corner cover may cover the first side of the coupling member.

The first corner cover may include a hook which protrudes from an inner surface of the first corner cover and is coupled to the coupling member.

The battery pack may further include a second corner cover which is coupled to the corner of the at least one battery module, and covers the second side of the coupling member.

The first corner cover may further include a groove on a rear side of the first corner cover, and the second corner cover may include a second protruding portion which protrudes toward a front side of the second corner cover and is inserted into the groove.

The at least one battery module may have a second opening at the corner to which the coupling member is secured, the battery pack may further include a cable which passes through the first opening and the second opening, and the second corner cover may cover the second opening and the cable.

To achieve the above-described objective, an energy storage system according to an aspect of the present disclosure includes the battery pack according to an aspect of the present disclosure.

Advantageous Effects

According to at least one of the embodiments of the present disclosure, there may be provided the battery pack that can change the number of battery modules.

According to at least one of the embodiments of the present disclosure, there may be provided the battery pack that can change the number of processing units.

According to at least one of the embodiments of the present disclosure, there may be provided the battery pack that can change the appearance.

According to at least one of the embodiments of the present disclosure, there may be provided the battery pack including the corner cover to cover the corner between the adjacent battery module or the adjacent processing unit and the battery module.

According to at least one of the embodiments of the present disclosure, there may be provided the battery pack with improved productivity and assembly through component sharing.

DESCRIPTION OF DRAWINGS

The accompanying drawings illustrate an exemplary embodiment of the present disclosure, and together with the following detailed description, serve to provide a further understanding of the technical aspect of the present disclosure, and thus, the present disclosure should not be construed as being limited to the drawings.

BEST MODE

Hereinafter, exemplary embodiments of the present disclosure will be described in detail with reference to the accompanying drawings. Prior to the description, it should be understood that the terms or words used in the specification and the appended claims should not be construed as limited to general and dictionary meanings, but rather interpreted based on the meanings and concepts corresponding to the technical aspect of the present disclosure on the basis of the principle that the inventor is allowed to define terms appropriately for the best explanation.

Therefore, the embodiments described herein and illustrations in the accompanying drawings are exemplary embodiments of the present disclosure to describe the technical aspect of the present disclosure and are not intended to be limiting, and thus it should be understood that a variety of other equivalents and modifications could have been made thereto at the time that the application was filed.

The term such as first, second or the like may be used herein. These terms are used to distinguish one element from another, and the nature, order or sequence of the stated elements is not limited by the term.

Figure 1:
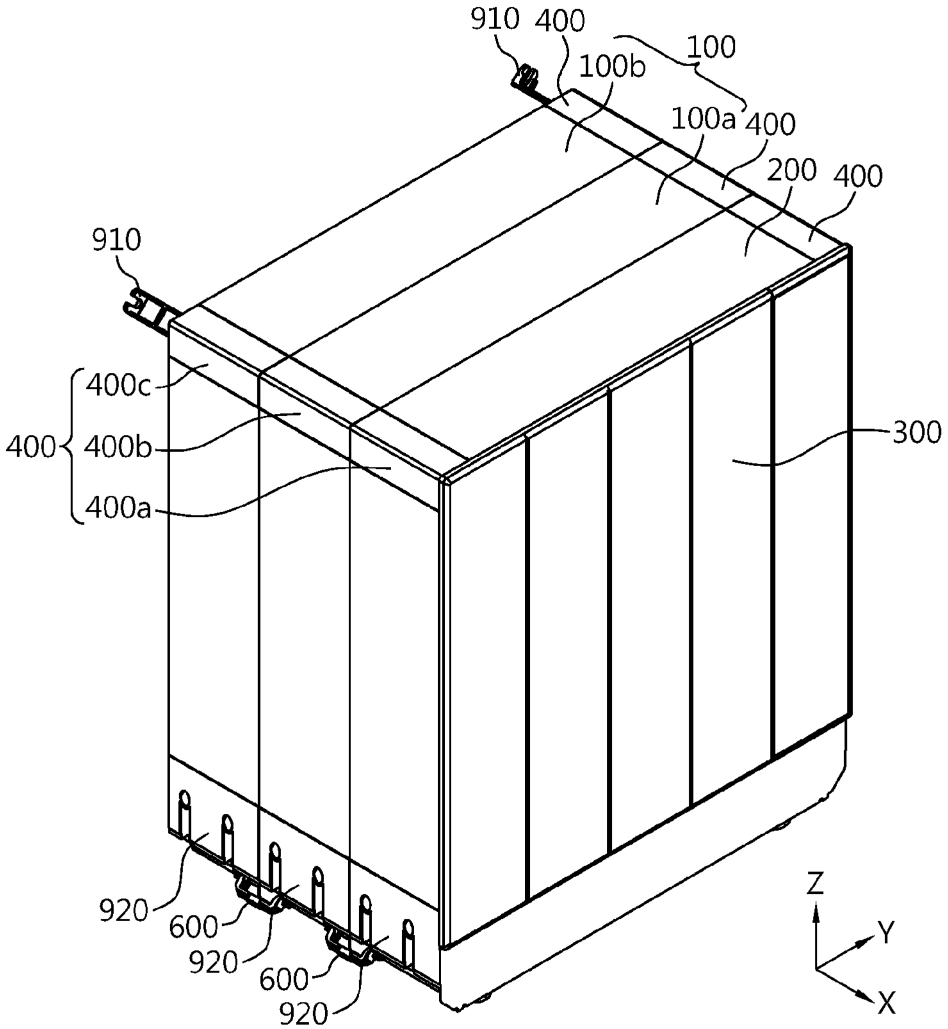
FIG. 1 is a perspective view of a battery pack according to an embodiment of the present disclosure.
Figure 2:
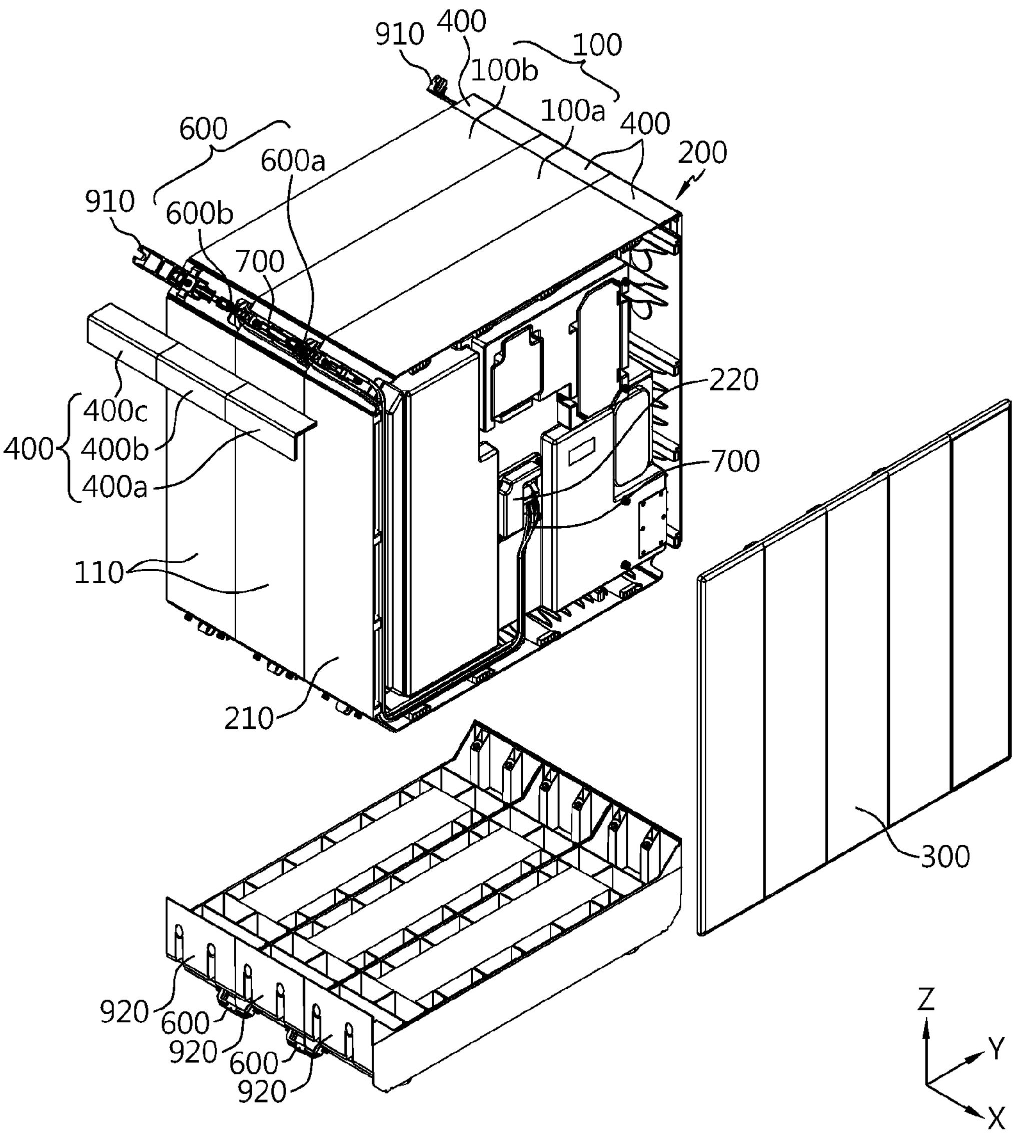
FIG. 2 is a partial exploded view of a battery pack according to an embodiment of the present disclosure.
Figure 3:
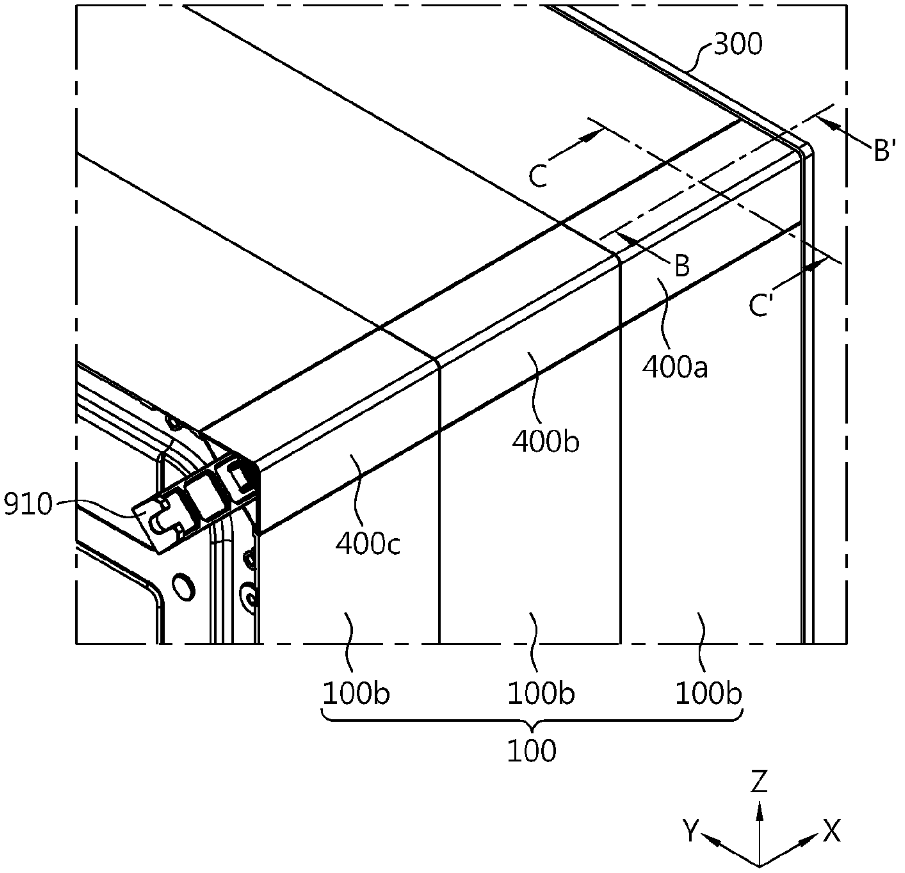
FIG. 3 is a partial enlarged view of a battery pack according to an embodiment of the present disclosure.

FIG. 1 is a perspective view of a battery pack according to an embodiment of the present disclosure. FIG. 2 is a partial exploded view of the battery pack according to an embodiment of the present disclosure. FIG. 3 is a partial enlarged view of the battery pack according to an embodiment of the present disclosure. Referring to FIGS. 1 to 3, the battery pack according to an embodiment of the present disclosure may include a battery module 100, a processing unit 200 and a corner cover 400.

The battery module 100 may have a first corner 111 formed by two side plates and a first opening 112 at the first corner 111. The battery module 100 may have a cuboidal shape. A housing 110 may form an appearance of the battery module 100. The housing 110 of the battery module 100 may include a front plate and four side plates. Additionally, the four side plates of the housing 110 may form four corners 111. The four corners may be chamfered. Alternatively, the corner 111 may be a plate connecting two side plates. Alternatively, the corner 111 may be formed by two side plates. The corner 111 may have the opening 112. The opening 112 may be open to the front side or in the X-axis direction. The four corners 111 may have substantially identical shape. The battery module 100 may include a plurality of battery cells inside. In this instance, the battery cell may be a secondary battery. The battery module 100 may charge the battery cell with power or discharge the power in the battery cell. The battery pack may include a plurality of battery modules 100 according to the amount of power or output required. For example, the battery pack may include two battery modules 100*a*, 100*b* as shown in FIG. 1.

The processing unit 200 may be disposed in front of the battery module 100*a*, and control the charge/discharge of the battery module 100. The processing unit 200 may include a second corner 211 near the first corner 111, and a second opening 212 at the second corner 211. The processing unit 200 may have a cuboidal shape. A housing 210 may form an appearance of the processing unit 200. The appearance or size of the processing unit 200 and the battery module 100 may be very similar or substantially identical to each other. The housing 210 of the processing unit 200 may include a front plate and four side plates. Additionally, the four side plates of the housing 210 may form four corners 211. The four corners 211 may be chamfered. Alternatively, the corner 211 may be a plate connecting two side plates. Alternatively, the corner 211 may be formed by two side plates. The corner 211 may have the opening 212. The opening 212 may be open to the front side or in the X-axis direction. The four corners 211 may have substantially identical shape. The processing unit 200 may be electrically connected, joined or coupled to the plurality of battery modules 100. The processing unit 200 may control the charge/discharge of the battery module 100. Additionally, the processing unit 200 may detect and acquire condition information of the battery module 100. The battery pack may include a plurality of processing units 200 to control the plurality of battery modules 100.

For example, the battery pack may include two battery modules 100 and one processing unit 200 as shown in FIG. 1. The two battery modules 100 and one processing unit 200 may be electrically connected to each other. The processing unit 200 may control the charge/discharge of three battery modules 100, and acquire or detect condition information of the three battery modules 100 such as voltage or temperature. Each corner 111 of the battery module 100 and each corner 211 of the processing unit 200 may have substantially identical shape.

The corner cover 400 may be coupled to the corner 211 of the processing unit 200. Additionally, the corner cover 400 may cover the opening 212 of the processing unit 200. The corner cover 400 may be referred to as a single corner cover 400. The single corner cover 400 may be configured to be coupled to any of the four corners 111 of the battery module 100 and the four corners 211 of the processing unit 200.

According to this configuration of the present disclosure, the battery pack may include various combinations of at least one battery module 100 and at least one processing unit 200. Additionally, the battery module 100 and the processing unit 200 of the battery pack may have various positional relationships or connection relationships. Accordingly, it is possible to flexibly respond to various amounts of power or outputs required for the battery pack. Additionally, as the appearance of the battery pack may be adaptable, the battery pack may be free of the limitation of the space in which the battery pack is installed.

Additionally, according to this configuration of the present disclosure, the single corner cover 400 may cover the corner 111 of the adjacent battery module 100 and the corner 211 of the processing unit 200 to protect the internal parts of the battery pack. The battery module 100 and the processing unit 200 may have the openings 112, 212 for connection to an external configuration, and in case where the openings 112, 212 are exposed, the inside may be damaged by impurity infiltration. The single corner cover 400 may cover the openings 112, 212 to protect the inside of the battery module 100 or the processing unit 200. Accordingly, it is possible to improve the safety and life of the battery pack.

Additionally, according to this configuration of the present disclosure, the single corner cover 400 may prevent sunlight from entering the battery module 100 or the processing unit 200 through the openings 112, 212 when the battery pack is installed outdoors. Accordingly, it is possible to improve the safety and life of the battery pack.

Figure 4:
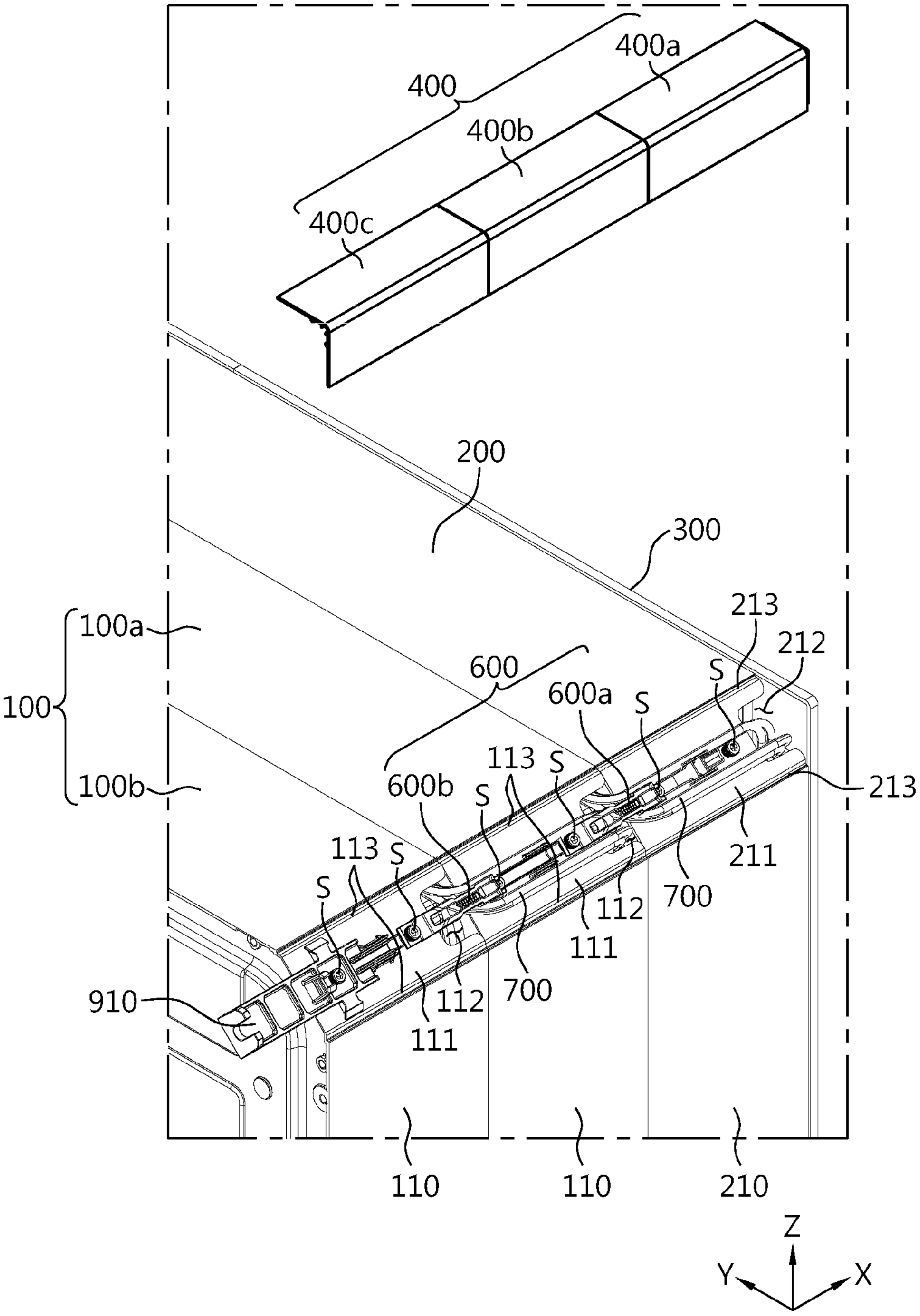
FIG. 4 is a partial enlarged exploded view of a battery pack according to an embodiment of the present disclosure.

FIG. 4 is a partial enlarged exploded view of the battery pack according to an embodiment of the present disclosure. Referring to FIGS. 2 to 4, the battery pack according to an embodiment of the present disclosure may further include a cable 700 that passes through the opening 212 and electrically connects the battery module 100 to the processing unit 200.

The cable 700 may electrically connect the battery module 100 to the processing unit 200. Additionally, the cable 700 may electrically connect two battery modules 100. Additionally, in the case where the battery pack includes a plurality of processing units 200, the cable 700 may electrically connect two processing units 200. A plurality of cables 700 may be included. The cable 700 may convey the power or a signal. The at least one battery module 100 and the at least one processing unit 200 of the battery pack may be arranged in various patterns. The cable 700 may be configured to pass through the openings 112, 212 at the corners 111, 211 disposed at a location at which it is easy to electrically connect the battery module 100 to the processing unit 200. The cable 700 may pass through the openings 112, 212 at the corners 111, 211 of any one of the battery module 100 and the processing unit 200 and then the openings 112, 212 at the corners 111, 211 of the other one.

The single corner cover 400 may cover the cable 700. The cable 700 and the openings 112, 212 may be covered by the single corner cover 400.

According to this configuration of the present disclosure, the single corner cover 400 may cover the cable 700 to prevent the infiltration of impurities into the cable 700. Additionally, the single corner cover 400 may cover the cable 700 to prevent sunlight-induced damage to the cable 700. Accordingly, it is possible to improve the safety and life of the battery pack.

Referring to FIGS. 1 to 4, the battery module 100 of the battery pack according to an embodiment of the present disclosure may be disposed at the rear of the processing unit 200. Additionally, the battery pack may include a coupling member 600 having one side secured to the corner 211 of the processing unit 200 and the other side secured to the corner 111 of the battery module 100.

A plurality of battery modules 100 may be included. A first battery module **100*a* may be disposed at the rear of the processing unit 200. A second battery module 100*b* may be disposed at the rear of the first battery module 100*a*. The coupling member 600*a* may couple the processing unit 200 to the first battery module 100*a*. Additionally, the coupling member 600*b* may couple the first battery module 100*a* and the second battery module 100*b*. The coupling member 600 may be secured to the corners 111, 211 on one side and the other side by a fastening member S. The coupling member 600 may be configured to be secured to any of the four corners of the battery module 100 and the four corners of the processing unit 200**.

For example, referring to FIG. 4, the coupling member **600*a* may be secured, on one side, to the corner 211 of the processing unit 200, and may be secured, on the other side, to the corner 111 of the first battery module 100*a*. Additionally, the coupling member 600*b* may be secured, on one side, to the corner 111 of the first battery module 100*a*, and may be secured, on the other side, to the corner 111 of the second battery module 100*b***.

According to this configuration of the present disclosure, the coupling member 600 may stably connect, couple or secure the battery module 100 and the processing unit 200 of the battery pack.

Referring to FIGS. 3 and 4, the battery pack according to an embodiment of the present disclosure may include a front cover 300 that is disposed on the front surface of the processing unit 200 and covers the front side of the corner cover 400.

The front cover 300 may be disposed on the front surface of the processing unit 200. Alternatively, the front cover 300 may be secured or coupled to the front plate or the front surface of the processing unit 200. The front cover 300 may have a larger area than the front surface or the front plate of the processing unit 200. The processing unit 200 may have a port 220 on the front surface or the front plate. The cable 700 may be connected to the port 220. The processing unit 200 may be electrically connected to the adjacent battery module 100 or the other processing unit 200 through the port 220. The front cover 300 may cover the port 220 and the cable 700 connected to the port 220.

Additionally, the front cover 300 may cover the front side of the single corner cover 400. The front cover 300 may cover a space between the single corner cover 400 and the corner 211 of the processing unit 200.

According to this configuration of the present disclosure, the front cover 300 may cover the space between the single corner cover 400 and the corner 211 of the processing unit 200 to prevent the infiltration of impurities. Accordingly, it is possible to improve the safety and life of the battery pack.

Figure 5:
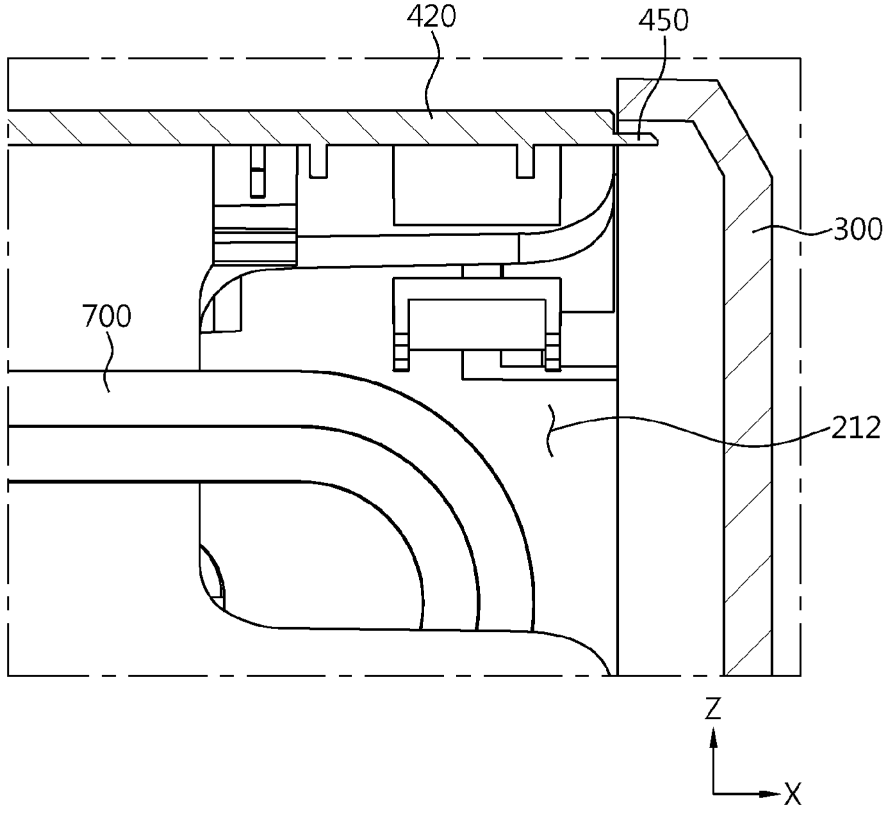
FIG. 5 is a partial cross-sectional view of FIG. 3, taken along the line D-D'.

FIG. 5 is a partial cross-sectional view of FIG. 3, taken along the line D-D'. Referring to FIG. 5, the corner cover 400 of the battery pack according to an embodiment of the present disclosure may include a protruding portion 450 that protrudes toward the front side and is inserted into the front cover 300.

The single corner cover 400 may include the protruding portion 450 that protrudes toward the front side. The protruding portion 450 may be formed over a first part 410 and a second part 420.

The front cover 300 may form a space. The protruding portion 450 may be inserted into the space formed by the front cover 300. Alternatively, the protruding portion 450 may be inserted into the front cover 300.

According to this configuration of the present disclosure, the protruding portion 450 may cover a gap between the front cover 300 and the single corner cover 400, and prevent the infiltration of impurities into the gap between the front cover 300 and the single corner cover 400. Accordingly, it is possible to improve the safety and life of the battery pack.

Figure 7:
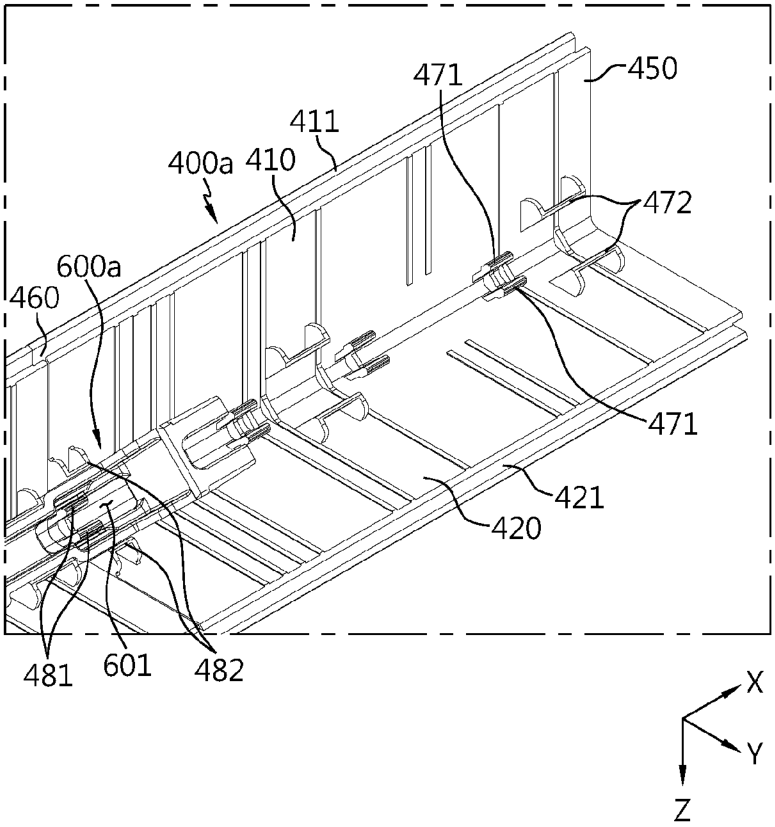
FIGS. 7 to 9 are diagrams of a corner cover of a battery pack according to an embodiment of the present disclosure.

FIG. 7 is a diagram of the corner cover 400 of the battery pack according to an embodiment of the present disclosure. Referring to FIGS. 5 and 7, the corner cover 400 according to an embodiment of the present disclosure may be slidably coupled to the coupling member 600 in the front-rear direction. The single corner cover 400 may slidably move and come into close contact with the front cover 300. The protruding portion 450 of the single corner cover 400 may be inserted into the front cover 300.

According to this configuration of the present disclosure, the battery module 100 and the processing unit 200 may have the openings 112, 212 for connection to an external configuration, and the inside may be damaged by infiltration of impurities in the case where the openings 112, 212 are exposed. The single corner cover 400 may be slidably movably coupled to the coupling member to effectively prevent the infiltration of impurities into the battery pack. Accordingly, it is possible to protect the inside of the battery module 100 or the processing unit 200 and improve the safety and life of the battery pack.

Figure 6:
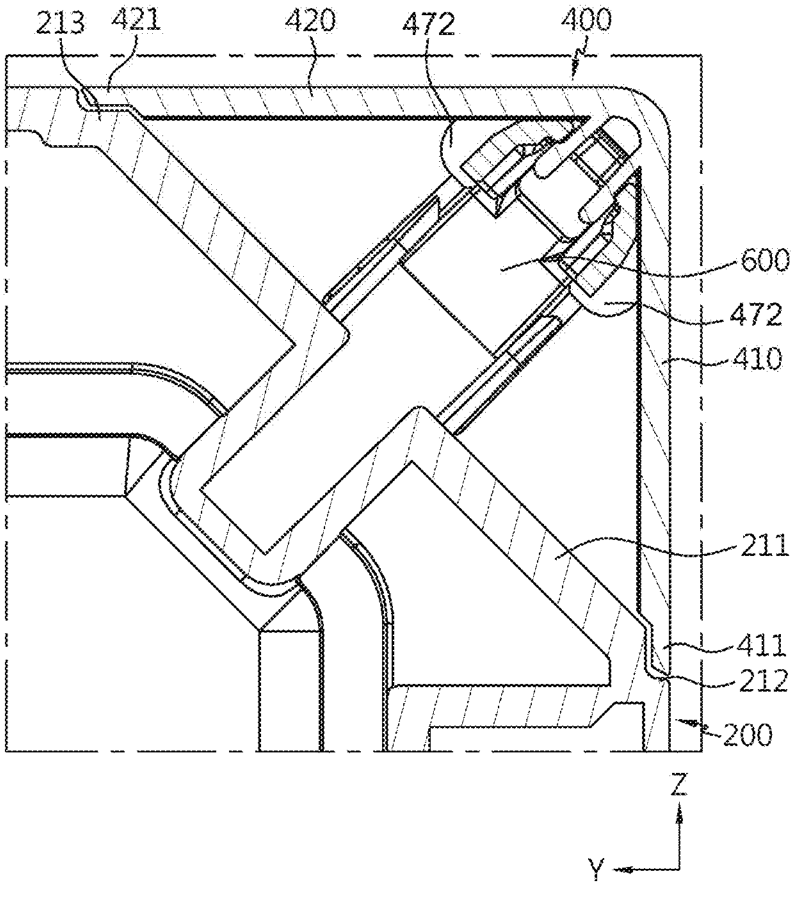
FIG. 6 is a partial cross-sectional view of FIG. 3, taken along the line E-E'.

FIG. 6 is a partial cross-sectional view of FIG. 3, taken along the line E-E'. Referring to FIG. 6, the single corner cover 400 of the battery pack according to an embodiment of the present disclosure may include a seating portion 411 along the edge of the first part 410. Additionally, the single corner cover 400 may include a seating portion 421 along edge of the second part 420. The seating portions 411, 421 of the single corner cover 400 may be seated on a step portion 213 of the corner 211. The step portion 213 may support the seating portions 411, 421 of the single corner cover 400. Additionally, the single corner cover 400 may cover the opening 212 of the corner 211.

According to this configuration of the present disclosure, the single corner cover 400 may be seated on the first step portion 113 and the second step portion 213 to maintain the stable coupling with the battery module 100 or the processing unit 200. Accordingly, it is possible to improve the stability of the battery pack.

Referring to FIG. 7, the corner cover 400*a* according to an embodiment of the present disclosure may include hooks 471, 481 that protrude from the inner surface and are coupled to the coupling member 600*a*. The single corner cover 400*a* may have a bent plate shape. The single corner cover 400*a* may include the first part 410 and the second part 420. The first part 410 and the second part 420 may form a bent plate shape. For example, the first part 410 and the second part 420 may be vertically connected to each other.

The single corner cover 400*a* may include a first guide 482 that protrudes from the inner surface and the first hook 481. A pair of first guides 482 may be included. A pair of first hooks 481 may be included. Each of the pair of first guides 482 may be disposed in each of the first part 410 and the second part 420. Each of the pair of first hooks 481 may be disposed in each of the first part 410 and the second part 420.

The single corner cover 400*a* may include a second guide 472 that protrudes from the inner surface and the second hook 471. A pair of second guides 472 may be included. A pair of second hooks 471 may be included. The pair of second guides 472 may be respectively disposed in the first part 410 and the second part 420. The pair of second hooks 471 may be respectively disposed in the first part 410 and the second part 420.

The first hook 481 may be secured to the coupling member 600*a*. The first hook 481 may be secured to a hole 601 of the coupling member 600*a*. The coupling member 600*a* may have a pair of holes 601. The pair of first hooks 481 may be secured to one hole 601. The coupling member 600*a* may be disposed between the pair of first guides 482. The single corner cover 400 may be hook-coupled to the coupling member 600*a* and slidably move in the front-rea direction or X-axis direction. The hole 601 may be formed in the shape of a long hole along which the first guide 482 may slidably move. The first guide 482 may guide the single corner cover 400*a* to slidably move along the coupling member 600*a*.

According to this configuration of the present disclosure, the single corner cover 400*a* may be easily hook-coupled to the coupling member 600*a* without any fastening member. Accordingly, it is possible to improve the assembly and productivity of the battery pack.

Figure 8:
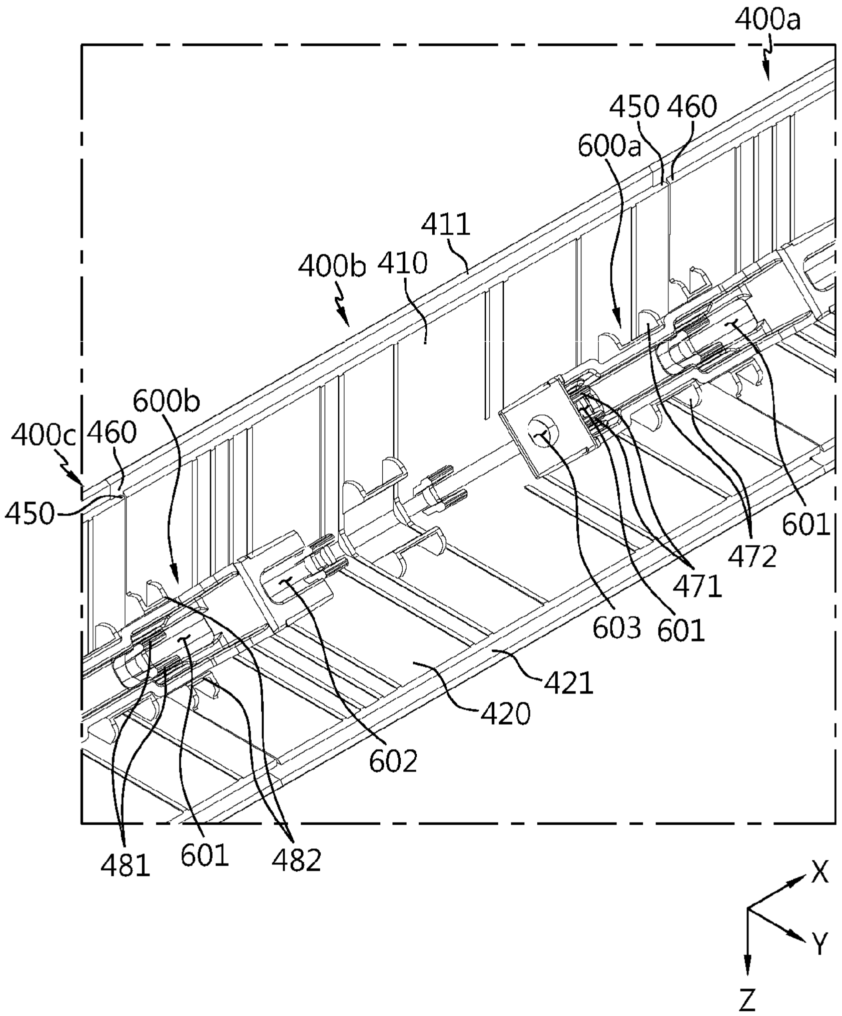

FIG. 8 is a diagram of the corner cover 400*b* of the battery pack according to an embodiment of the present disclosure. Referring to FIG. 8, the corner cover 400*b* according to an embodiment of the present disclosure may include the hooks 471, 481 that protrude from the inner surface and are coupled to the coupling members 600*a*, 600*b*.

The second hook 471 may be secured to the coupling member 600*b*. The second hook 471 may be secured to a hole 601 of the coupling member 600*a*. The coupling member 600*a* may have a pair of holes 601. The pair of second hooks 471 may be secured to one hole 601. The coupling member 600*a* may be disposed between the pair of second guides 472. The single corner cover 400*b* may be hook-coupled to the coupling member 600*a*, and slidably move in the front-rear direction or X-axis direction. The hole 601 may be formed in the shape of a long hole, along which the second guide 472 may slidably move. The second guide 472 may guide the single corner cover 400*b* to slidably move along the coupling member 600*a*.

The coupling member 600*a* may have holes 602, 603 on one side and the other side. The coupling member 600 may be secured to the corners 111, 211 by the fastening member S passing through the holes 602, 603. The hole 602 on one side may be open to the front side or in the X-axis direction. Due to this shape, the coupling member 600 may be easily secured to the corners 111, 211 in response to the tolerance occurring in the production process of the battery module 100 and the processing unit 200.

According to this configuration of the present disclosure, the single corner cover 400*b* may be easily hook-coupled to the coupling member 600*a* without any fastening member. Accordingly, it is possible to improve the assembly and productivity of the battery pack.

Referring to FIG. 8, the battery pack according to an embodiment of the present disclosure may include a first corner cover 400*a* and a second corner cover 400*b*. The first corner cover 400*a* may cover one side of the coupling member 600*a*, and the second corner cover 400*b* may cover the other side of the coupling member 600*a*. The first corner cover 400*a* and the second corner cover 400*b* may be the same component or part.

The two single corner covers 400*a*, 400*b* may be coupled to one coupling member 600*a*. Additionally, one coupling member 600*a* may be covered by the two single corner covers 400*a*, 400*b*.

According to this configuration of the present disclosure, as the two single corner covers 400*a*, 400*b* are coupled to one coupling member 600*a*, it is possible to reduce the number of components. Accordingly, it is possible to improve the assembly and productivity of the battery pack.

Referring to FIG. 8, the first corner cover of the battery pack according to an embodiment of the present disclosure may include a groove on the rear side, and the second corner cover may include a second protruding portion that protrudes toward the front side and is inserted into the groove.

The single corner covers 400*a*, 400*b* may have the groove 460 on the rear side. The groove 460 may be formed over the first part 410 and the second part 420. The groove 460 may have a corresponding shape to the protruding portion 450. The second single corner cover 400*b* may be hook-coupled to the coupling members 600*a*, 600*b* and slidably move. By the sliding movement, the protruding portion 450 of the second single corner cover 400*b* may be inserted into the groove 460 of the first single corner cover 400*a*.

According to this configuration of the present disclosure, it is possible to prevent a gap between the adjacent single corner covers 400*a*, 400*b*. Accordingly, it is possible to prevent the infiltration of impurities into the battery pack, and improve the safety and life of the battery pack.

Referring to FIGS. 3, 4 and 8, the processing unit 200 of the battery pack according to an embodiment of the present disclosure may have the first opening 212, and the battery module 100*a* may have the second opening 112. Additionally, the battery pack may include the cable 700 passing through the first opening 212 and the second opening 112. Additionally, the second corner cover 400*b* may cover the second opening 112 and the cable 700.

The cable 700 may pass through the opening 212 of the processing unit 200 and the opening 112 of the battery module 100*a*. The single corner covers 400*a*, 400*b* may cover the corner 21 of the processing unit 200 and the corner 111 of the battery module 100*a*. Additionally, the single corner covers 400*a*, 400*b* may cover the opening 212 of the processing unit 200 and the opening 112 of the battery module 100*a*. Additionally, the single corner covers 400*a*, 400*b* may cover the coupling members 600*a*, 600*b*. Additionally, the single corner covers 400*a*, 400*b* may cover the cable 700.

According to this configuration of the present disclosure, the single corner covers 400*a*, 400*b* may prevent the exposure of the corners 211, 111 of the processing unit 200 or the battery module 100*a* and the components adjacent to the corners 211, 111, and prevent the infiltration of external impurities. Accordingly, it is possible to improve the safety and life of the battery pack.

Figure 9:
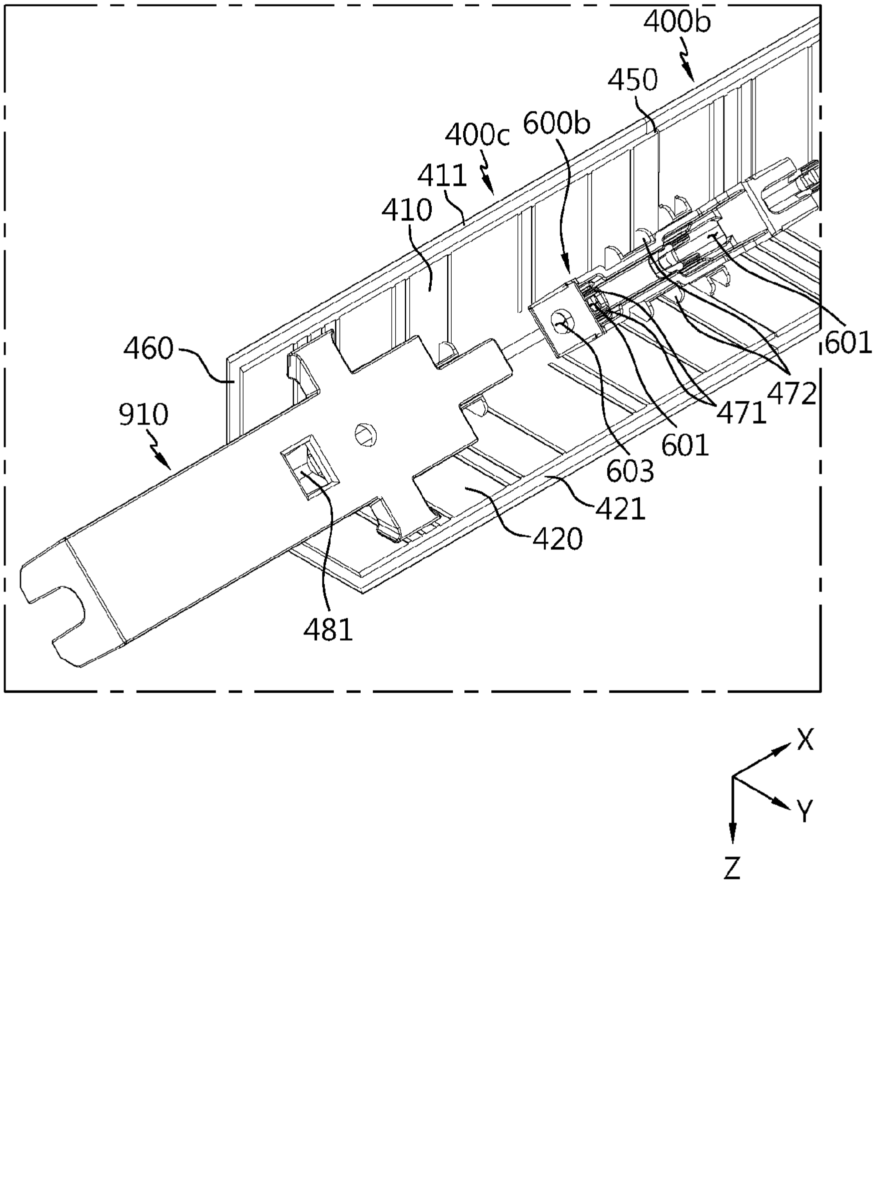
Figure 10:
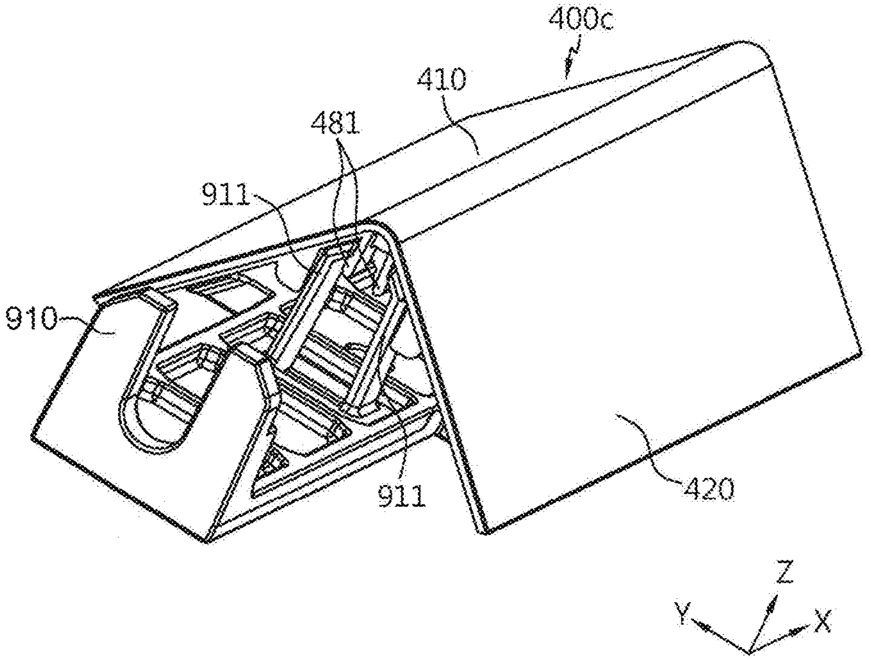
FIG. 10 is a diagram of a corner cover and an installation bracket of a battery pack according to an embodiment of the present disclosure.

FIG. 9 is a diagram of the corner cover 400*c* of the battery pack according to an embodiment of the present disclosure. FIG. 10 is a diagram of the corner cover 400*c* and an installation bracket 910 of the battery pack according to an embodiment of the present disclosure. Referring to FIGS. 4, 9 and 10, the battery pack according to an embodiment of the present disclosure may include the installation bracket 910. The installation bracket 910 may be secured to the cover 111 of the battery module 100*b* by the fastening member S. The installation bracket 910 may secure the battery pack to a structure such as a wall.

The installation bracket 910 may include a coupling portion 911. The hook 481 of the single corner cover 400*c* may be coupled to the coupling portion 911. The coupling portion 911 may be disposed between the guides 482 of the single corner cover 400*c*. Additionally, the single corner cover 400*c* may cover at least part of the installation bracket 910.

Referring to FIG. 1, the battery pack may include a stand 920. The stand 920 may be disposed in each of the processing unit 200 and the battery module 100. The plurality of stands 920 may be connected, coupled or secured by the coupling member 600. The stand 920 may increase the height of the battery pack. When the battery pack is installed outdoors or on the ground, the battery pack may be damaged by rain. The battery pack may include the stand 920 to protect the battery module 100 or the processing unit 200.

Although the plurality of battery modules 100, 100*a*, 100*b* is described with different reference numerals for convenience of description, they have the same structure and shape. Additionally, although the coupling members 600, 600*a*, 600*b* are described with different reference numerals for convenience of description, they have the same structure and shape. Additionally, although the single corner covers 400, 400*a*, 400*b* are described with different reference numerals for convenience of description, they have the same structure and shape.

An energy storage system according to the present disclosure includes at least one battery pack according to the present disclosure. In addition to the battery pack, the energy storage system according to the present disclosure may further include components commonly included in energy storage systems. In particular, the energy storage system according to the present disclosure may be a home energy storage system or an energy storage system for buildings used to store energy in houses or buildings.

The terms indicating directions such as upper, lower, left, right, front and rear are used herein for convenience only, and it should be obvious to those skilled in the art that these terms may change depending on the position of the stated element or an observer.

While the present disclosure has been hereinabove described with regard to a limited number of embodiments and drawings, the present disclosure is not limited thereto, and it is apparent that a variety of changes and modifications may be made by those skilled in the art within the scope of the present disclosure and the appended claims and their equivalents.

What is claimed is:

1. A battery pack, comprising:

at least one battery module;

a processor having a housing with a corner formed by two side plates and a first opening at the corner, wherein the processor is electrically connected to the at least one battery module and controls charge/discharge of the at least one battery module; and a first corner cover which is coupled to the corner and which covers the first opening, the first corner cover including:

a first part planar with one of the two side plates; and a second part planar with the other of the two side plates.

2. The battery pack according to claim 1, further comprising:

a cable which passes through the first opening, and electrically connects the at least one battery module to the processor.

3. The battery pack according to claim 1, further comprising:

a front cover which is disposed on a front surface of the processor and covers a front side of the first corner cover.

4. The battery pack according to claim 3, wherein the first corner cover includes a protruding portion which protrudes from the front side of the first corner cover and is inserted into the front cover.

5. The battery pack according to claim 1, wherein the at least one battery module is disposed at a rear of the processor, and wherein the battery pack further comprises a coupling member, wherein a first side of the coupling member is secured to the corner of the processor and a second side of the coupling member is secured to the corner of the at least one battery module.

6. The battery pack according to claim 5, wherein the first corner cover is slidably coupled to the coupling member in a front-rear direction.

7. The battery pack according to claim 5, wherein the first corner cover covers the first side of the coupling member.

8. The battery pack according to claim 5, wherein the first corner cover includes a hook which protrudes from an inner surface of the first corner cover and is coupled to the coupling member.

9. The battery pack according to claim 5, further comprising:

a second corner cover which is coupled to the corner of the at least one battery module, and which covers the second side of the coupling member.

10. The battery pack according to claim 9, wherein the first corner cover further includes a groove on a rear side of the first corner cover, and wherein the second corner cover includes a second protruding portion which protrudes toward a front side of the second corner cover and is inserted into the groove.

11. The battery pack according to claim 9, further comprising:

a second opening at the corner to which the coupling member is secured, wherein the battery pack further comprises a cable which passes through the first opening and the second opening, and wherein the second corner cover covers the second opening and the cable.

12. An energy storage system comprising the battery pack according to claim 1.

13. A battery pack, comprising:

at least one battery module;

a processor having a housing with a corner formed by two side plates and a first opening at the corner, wherein the processor is electrically connected to the at least one battery module and controls charge/discharge of the at least one battery module, and wherein the at least one battery module is disposed at a rear of the processor;

a first corner cover which is coupled to the corner and which covers the first opening; and a coupling member, a first side of the coupling member being secured to the corner of the processor and a second side of the coupling member being secured to the corner of the at least one battery module, wherein the first corner cover is slidably coupled to the coupling member in a front-rear direction.

14. A battery pack, comprising:

at least one battery module;

a processor having a housing with a corner formed by two side plates and a first opening at the corner, wherein the processor is electrically connected to the at least one battery module and controls charge/discharge of the at least one battery module, and wherein the at least one battery module is disposed at a rear of the processor;

a first corner cover which is coupled to the corner and which covers the first opening;

a coupling member, a first side of the coupling member being secured to the corner of the processor and a second side of the coupling member being secured to the corner of the at least one battery module; and a second corner cover which is coupled to the corner of the at least one battery module and which covers the second side of the coupling member.

15. The battery pack according to claim 14, wherein the first corner cover further includes a groove on a rear side of the first corner cover, and wherein the second corner cover includes a second protruding portion which protrudes toward a front side of the second corner cover and is inserted into the groove.

16. The battery pack according to claim 14, further comprising:

a second opening at the corner to which the coupling member is secured, wherein the battery pack further comprises a cable which passes through the first opening and the second opening, and wherein the second corner cover covers the second opening and the cable.

* * * * *